(12) United States Patent
Levine

(10) Patent No.: US 12,093,076 B2
(45) Date of Patent: Sep. 17, 2024

(54) ACCESSORY DISPLAY DEVICE

(71) Applicant: Xebec, Inc., Austin, TX (US)

(72) Inventor: Alex Cole Levine, Austin, TX (US)

(*) Notice: Subject to any disclaimer, the term of this patent is extended or adjusted under 35 U.S.C. 154(b) by 0 days.

(21) Appl. No.: 18/157,074

(22) Filed: Jan. 20, 2023

(65) Prior Publication Data

US 2023/0152846 A1 May 18, 2023

Related U.S. Application Data

(63) Continuation of application No. 17/074,632, filed on Oct. 20, 2020, now Pat. No. 11,573,596, which is a continuation of application No. 16/673,920, filed on Nov. 4, 2019, now Pat. No. 10,809,762.

(51) Int. Cl.
*G06F 1/16* (2006.01)

(52) U.S. Cl.
CPC .......... *G06F 1/1607* (2013.01); *G06F 1/1616* (2013.01); *G06F 1/1632* (2013.01)

(58) Field of Classification Search
CPC .................................................... G06F 1/1607
See application file for complete search history.

(56) References Cited

U.S. PATENT DOCUMENTS

| | | | |
|---|---|---|---|
| 1,936,558 | A | 11/1933 | Meyers |
| 5,035,392 | A | 7/1991 | Gross et al. |
| 5,768,096 | A | 6/1998 | Williams et al. |
| 6,151,401 | A | 11/2000 | Annaratone |
| 6,222,507 | B1 | 4/2001 | Gouko |
| D449,302 | S | 10/2001 | Jung |
| 6,302,612 | B1 | 10/2001 | Fowler et al. |
| 6,532,146 | B1 | 3/2003 | Duquette |
| 6,643,124 | B1 | 11/2003 | Wilk |
| 6,667,877 | B2 | 12/2003 | Duquette |

(Continued)

FOREIGN PATENT DOCUMENTS

| | | |
|---|---|---|
| BE | 1024236 B9 | 2/2018 |
| CA | 189545 S | 12/2020 |

(Continued)

OTHER PUBLICATIONS

"Sidetrak", https://sidetrak.com as viewed Nov. 14, 2019, United States.

(Continued)

*Primary Examiner* — Lisa Lea-Edmonds
(74) *Attorney, Agent, or Firm* — Stovall Legal, PLLC; Blake D. Stovall

(57) ABSTRACT

An accessory display device comprises a housing having a first side and a second side movable relative to one another. The accessory display device further comprises a first rail coupled to the first side and a second rail coupled to the second side, wherein the first rail is slidable relative to the second rail. The accessory display device further comprises a tensioning member configured to place tension between the first side and the second side. The accessory display device further comprises a first engagement portion coupled to the first side and a second engagement portion coupled to the second side. The accessory display device further comprises at least one display coupled to the housing, wherein the first display is movable from a stowed position to a use position.

20 Claims, 6 Drawing Sheets

(56) References Cited

U.S. PATENT DOCUMENTS

| | | |
|---|---|---|
| 6,794,798 B2 | 9/2004 | Watanabe et al. |
| 6,859,219 B1 | 2/2005 | Sall |
| 6,967,632 B1 | 11/2005 | Minami et al. |
| D534,214 S | 12/2006 | Marcy et al. |
| 7,283,353 B1 | 10/2007 | Jordan et al. |
| 7,375,954 B2 | 5/2008 | Yang |
| D594,236 S | 6/2009 | Sidiropoulos |
| D599,357 S | 9/2009 | Kaufman |
| 7,633,744 B2 | 12/2009 | Kuhn |
| D615,082 S | 5/2010 | Taichi |
| 7,752,789 B2 | 7/2010 | Sun et al. |
| 7,813,118 B2 | 10/2010 | Burge |
| D630,204 S | 1/2011 | Kovac |
| D630,205 S | 1/2011 | Kovac |
| D630,206 S | 1/2011 | Kovac |
| D630,628 S | 1/2011 | Kovac |
| D634,745 S | 3/2011 | Park et al. |
| 7,936,558 B2 * | 5/2011 | Chang .................. G06F 1/1616 361/679.04 |
| 8,018,715 B2 * | 9/2011 | Chang .................. G06F 1/1647 361/679.04 |
| D652,832 S | 1/2012 | Wu et al. |
| 8,243,471 B2 * | 8/2012 | Liang .................. G06F 1/1607 361/810 |
| 8,317,146 B2 | 11/2012 | Jung et al. |
| D679,707 S | 4/2013 | Aarrestad et al. |
| D694,754 S | 12/2013 | Nakada |
| 8,842,425 B2 | 9/2014 | Ryu |
| 8,854,278 B2 | 10/2014 | Parker et al. |
| D761,800 S | 7/2016 | Muller |
| 9,393,757 B2 | 7/2016 | Borchardt et al. |
| 9,395,757 B2 | 7/2016 | Relf |
| 9,441,782 B2 | 9/2016 | Funk et al. |
| D770,447 S | 11/2016 | Endo et al. |
| D770,448 S | 11/2016 | Endo et al. |
| 9,523,461 B2 | 12/2016 | Kuan et al. |
| 9,568,952 B2 | 2/2017 | Matzke et al. |
| 9,696,760 B1 | 7/2017 | Zhang |
| D810,079 S | 2/2018 | Boesiger et al. |
| 9,927,839 B2 | 3/2018 | Kummer et al. |
| 10,082,832 B1 * | 9/2018 | Wang .................. G06F 1/1681 |
| 10,168,739 B1 | 1/2019 | Chen |
| D864,958 S | 10/2019 | Yüksek et al. |
| 10,809,762 B1 * | 10/2020 | Levine .................. G06F 1/1607 |
| 10,817,020 B1 | 10/2020 | DeMaio |
| 10,871,801 B2 | 12/2020 | Yao et al. |
| D910,624 S | 2/2021 | Hudgins et al. |
| 10,944,937 B2 | 3/2021 | Pei |
| D920,975 S | 6/2021 | Yao et al. |
| D938,436 S | 12/2021 | Gu |
| 11,209,869 B2 * | 12/2021 | Hudgins .............. G06F 1/1654 |
| D956,752 S | 7/2022 | Wang |
| D962,222 S | 8/2022 | Leung et al. |
| 11,416,024 B2 * | 8/2022 | Bryant .................. G06F 1/1632 |
| 11,573,596 B2 * | 2/2023 | Levine .................. G06F 1/1607 |
| 11,815,953 B2 * | 11/2023 | Yao ........................ G06F 1/1681 |
| 11,907,012 B2 * | 2/2024 | Levine .................. G06F 1/1616 |
| 2003/0095373 A1 * | 5/2003 | Duquette .............. G06F 1/1683 361/679.04 |
| 2005/0006331 A1 | 1/2005 | Engel |
| 2005/0237699 A1 | 10/2005 | Carroll |
| 2005/0253775 A1 * | 11/2005 | Stewart .................. G06F 1/1616 345/1.1 |
| 2006/0059751 A1 | 3/2006 | Chen et al. |
| 2006/0082518 A1 * | 4/2006 | Ram ...................... G06F 1/1635 345/1.1 |
| 2007/0247798 A1 | 10/2007 | Scott |
| 2008/0198096 A1 | 8/2008 | Jung |
| 2009/0102744 A1 * | 4/2009 | Ram ...................... G06F 1/1696 345/1.1 |
| 2009/0201222 A1 | 8/2009 | Damian |
| 2010/0039350 A1 | 2/2010 | Wakefield et al. |
| 2010/0053027 A1 | 3/2010 | Tonnison et al. |
| 2010/0124006 A1 * | 5/2010 | Chang .................. G06F 1/1624 361/679.04 |
| 2010/0124008 A1 * | 5/2010 | Chang .................. G06F 1/1616 361/679.26 |
| 2011/0019360 A1 | 1/2011 | Thabit |
| 2011/0155868 A1 | 6/2011 | Sun et al. |
| 2012/0223872 A1 * | 9/2012 | Ram ...................... G06F 1/1662 345/1.3 |
| 2012/0280603 A1 | 11/2012 | Hsu et al. |
| 2013/0077213 A1 | 3/2013 | Kao et al. |
| 2015/0212546 A1 * | 7/2015 | Ram ...................... G06F 1/1654 361/679.01 |
| 2015/0378393 A1 | 12/2015 | Erad et al. |
| 2016/0124466 A1 * | 5/2016 | Ram ...................... G06F 1/1666 361/679.26 |
| 2016/0154434 A1 * | 6/2016 | Lakhani ................ G06F 1/1628 29/592.1 |
| 2016/0320797 A1 * | 11/2016 | Ram ...................... G06F 1/1662 |
| 2017/0003712 A1 | 1/2017 | Funk et al. |
| 2017/0255232 A1 * | 9/2017 | Ram ...................... G06F 1/1649 |
| 2018/0088630 A1 * | 3/2018 | Ram ...................... G06F 1/1654 |
| 2018/0275717 A1 * | 9/2018 | Ram ...................... G06F 1/1681 |
| 2020/0278722 A1 * | 9/2020 | Hudgins .............. H05K 5/0247 |
| 2020/0333843 A1 * | 10/2020 | Yao ........................ G06F 1/1622 |
| 2021/0080999 A1 * | 3/2021 | Bryant .................. G06F 1/1641 |
| 2021/0134130 A1 | 5/2021 | Kiani et al. |
| 2021/0405702 A1 | 12/2021 | Hudgins et al. |
| 2022/0075421 A1 * | 3/2022 | Hudgins .............. G06F 1/1616 |
| 2022/0390982 A1 * | 12/2022 | Levine .................. G06F 1/1637 |
| 2023/0152846 A1 * | 5/2023 | Levine .................. G06F 1/1632 361/679.04 |
| 2023/0152847 A1 * | 5/2023 | Levine .................. G06F 1/1647 361/679.04 |

FOREIGN PATENT DOCUMENTS

| | | |
|---|---|---|
| CN | 206920985 U | 1/2018 |
| CN | 207529271 U | 6/2018 |
| CN | 304986389 | 1/2019 |
| CN | 305087700 S | 3/2019 |
| DE | 102007013565 A1 | 4/2008 |
| JP | 2010128105 A | 6/2010 |
| JP | 5077049 B2 | 11/2012 |

OTHER PUBLICATIONS

"Slidenjoy—Le Slide", https://yourslide.com as viewed Nov. 13, 2019, United States.

Duex, https://www.mobilepixels.us/products/duex as viewed Nov. 13, 2019, United States.

* cited by examiner

ACCESSORY DISPLAY DEVICE

CROSS-REFERENCE TO RELATED APPLICATIONS

This application claims the priority benefit of U.S. patent application Ser. No. 17/074,632, filed Oct. 20, 2020, which claims the priority benefit of U.S. patent application Ser. No. 16/673,920, filed Nov. 4, 2019.

BACKGROUND OF THE INVENTION

Laptop computers have been a huge benefit for people who like to have the ability of a personal computer wherever they are. Whether it be for work, study, or entertainment, the portability of laptop computers has been very advantageous. However, the tradeoff for laptop computers portability has always been the size of the display screen. The bigger the display, the bigger the laptop computer and the less portable it becomes. Therefore, there is a need for a device which allows for the laptop computer display to be expanded. There is also a need for a device that allows for the laptop computer display to be expanded and may be added onto the laptop computer easily and is also compact and portable.

SUMMARY OF THE INVENTION

An example embodiment relates to an accessory display device for a computer. The device includes a housing having a first side and a second side movable relative to one another. The device also includes a first rail coupled to the first side and a second rail coupled to the second side, wherein the first rail is slidable relative to the second rail. The device also includes a tensioning member configured to place tension between the first side and the second side. The device also includes a first engagement portion coupled to the first side and a second engagement portion coupled to the second side. The first engagement portion and the second engagement portion are configured to engage the side of a display device under force created by the tensioning member. The device also includes a first display coupled to the housing, wherein the first display is movable from a stowed position to a use position.

Another example embodiment relates to an accessory display device for a computer. The device includes a housing having a first side and a second side movable relative to one another. The device also includes a first rail coupled to the first side and a second rail coupled to the second side, wherein the first rail is slidable relative to the second rail. The device further includes a tensioning member configured to place tension between the first side and the second side. The device also includes a first engagement portion coupled to the first side and a second engagement portion coupled to the second side. The first engagement portion and the second engagement portion are configured to engage the side of a display device under force created by the tensioning member. The device also includes a first display coupled to the housing, wherein the first display is movable from a stowed position to a use position.

Another example embodiment relates to an accessory display device for a computer. The device includes a means for housing at least one display screen, wherein the means for housing the at least one display screen has a first side and a second side slidable relative to one another. The device further includes a first means for engaging a side of a display device, wherein the first means for engaging a side of the display device is associated with the first side. The device further includes a second means for engaging a side of the display device, wherein the second means for engaging a side of the display device is associated with the second side. The device further includes a means for tensioning the first side and the second side, wherein the means for tensioning the first side and the second side places tension between the first side and the second side, whereby the means for tensioning the first side and the second side provides forces to the first means for engaging a side of the display device and the second means for engaging a side of the display device. The device further includes a first display means within the means for housing at least one display, wherein the first display means is movable from a stowed position to a use position.

In addition to the foregoing, other aspects are described in the claims, drawings, and text forming a part of the disclosure set forth herein. The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the disclosures set forth herein.

BRIEF DESCRIPTION OF DRAWINGS

The use of the same symbols in different drawings typically indicates similar or identical items unless context dictates otherwise.

DETAILED DESCRIPTION OF THE INVENTION

Figure 1:
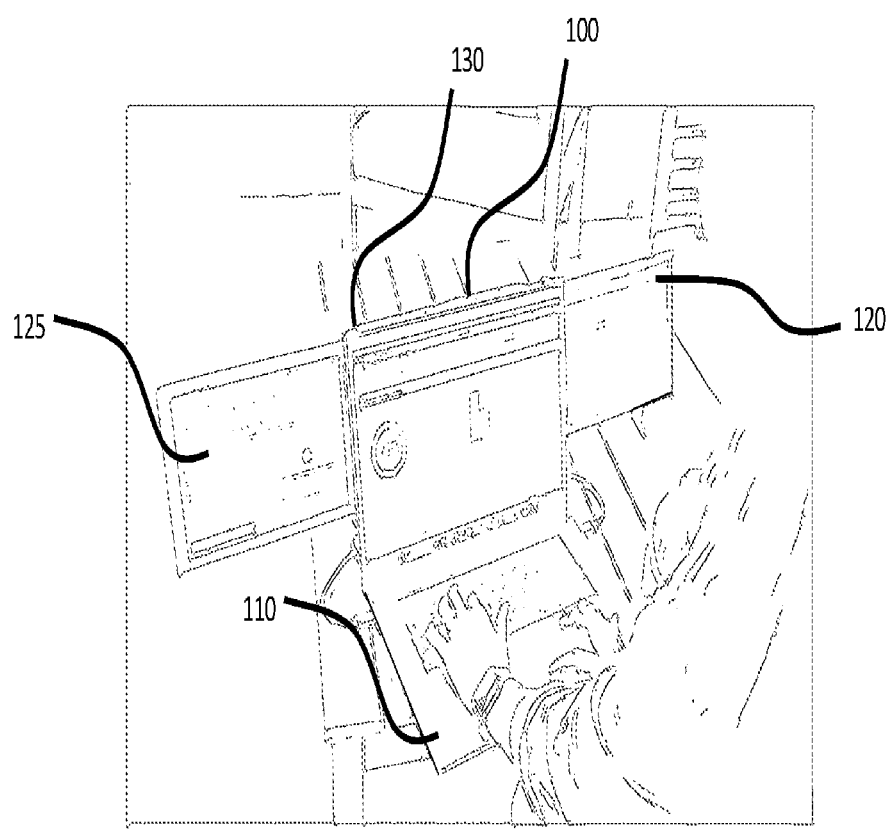
FIG. 1 is a depiction of an accessory display device for a laptop computer in accordance with an example embodiment.

Referring to FIG. 1, a computer display accessory 100 is depicted coupled to a laptop computer 110. Computer display accessory 100 is not limited to laptop computers but may be used on any type of display device including but not limited to tablets, e-readers, gaming devices, desktop displays, television displays, etc. Therefore, computer display accessory 100 is not limited to computers and in fact may be utilized on any type of display. Display accessory 100 adds two additional screens 120 and 125 to any existing display. Display accessory 100 expands the screen display real estate with two slidable screens that pull out from the back edges of a housing 130. Housing 130 itself is universal, fitting laptops of all sizes and uses tension from elastic to tighten around the edges of the laptop screen.

Figure 2:
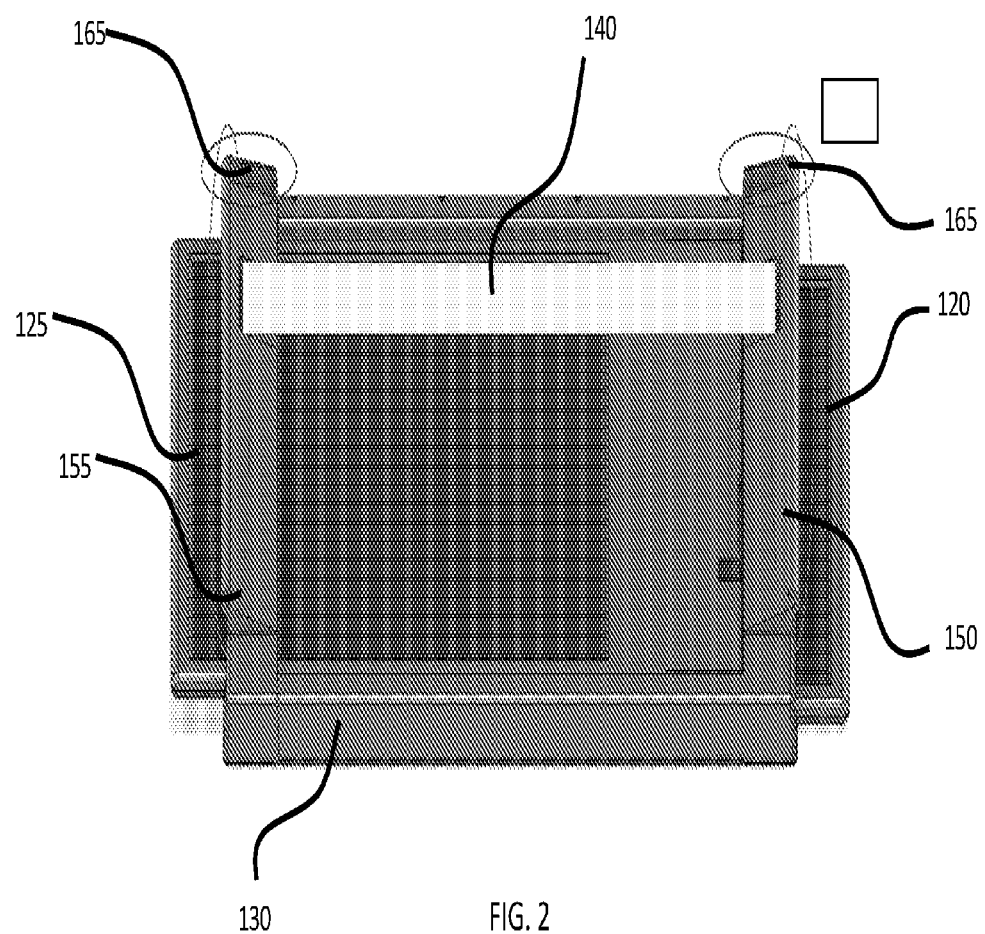
FIG. 2 is an example embodiment of the accessory display device of FIG. 1 removed from the laptop computer.

Referring to FIG. 2, housing 130 includes a mechanism that allows the screens to engage with the lid of the computer display accessory 110 and to pull out from either side. Housing 130 uses an elastic band 140 or other tensioning member to create tension between a right frame clip 150 and a left frame clip 155 which creates force when pulled apart to put on the lid, effectively clamping either side to the computer lid. There is also a lip 160 on the top of right frame clip 155 and a lip 165 on the top of left frame clip 155. The lip helps to further secure display accessory 100 on the top of computer 110 display and helps further secure computer display accessory 100 to computer 110. When a user pulls apart the left and right sides of housing 130, an increasing tension is created in the elastic band forcing either side back towards each other. This is what creates the "clamping" effect of the right frame clip 150 and the left frame clip 155.

In accordance with an example embodiment, elastic band 140 may be replaced with any type of suitable tensioning member, including but not limited to a spring, a rubber band, resilient plastic portions, etc. These tensioning members may be coupled to housing portions 170 and 175 in any of a variety of ways including but not limited to with glue, by melting, by tying or sewing, by clipping, etc. In one example, the band 140 may be threaded through a cutout on each portion of housing 130. Once threaded through the cutout, a blocking piece which does not fit through the cutout is affixed to the band so the band does not slip back through the cutout and maintains tension on the band. Any of a variety of ways may be used to attach the tensioning member to the two housing portions without departing from the scope of the invention.

Figure 3:
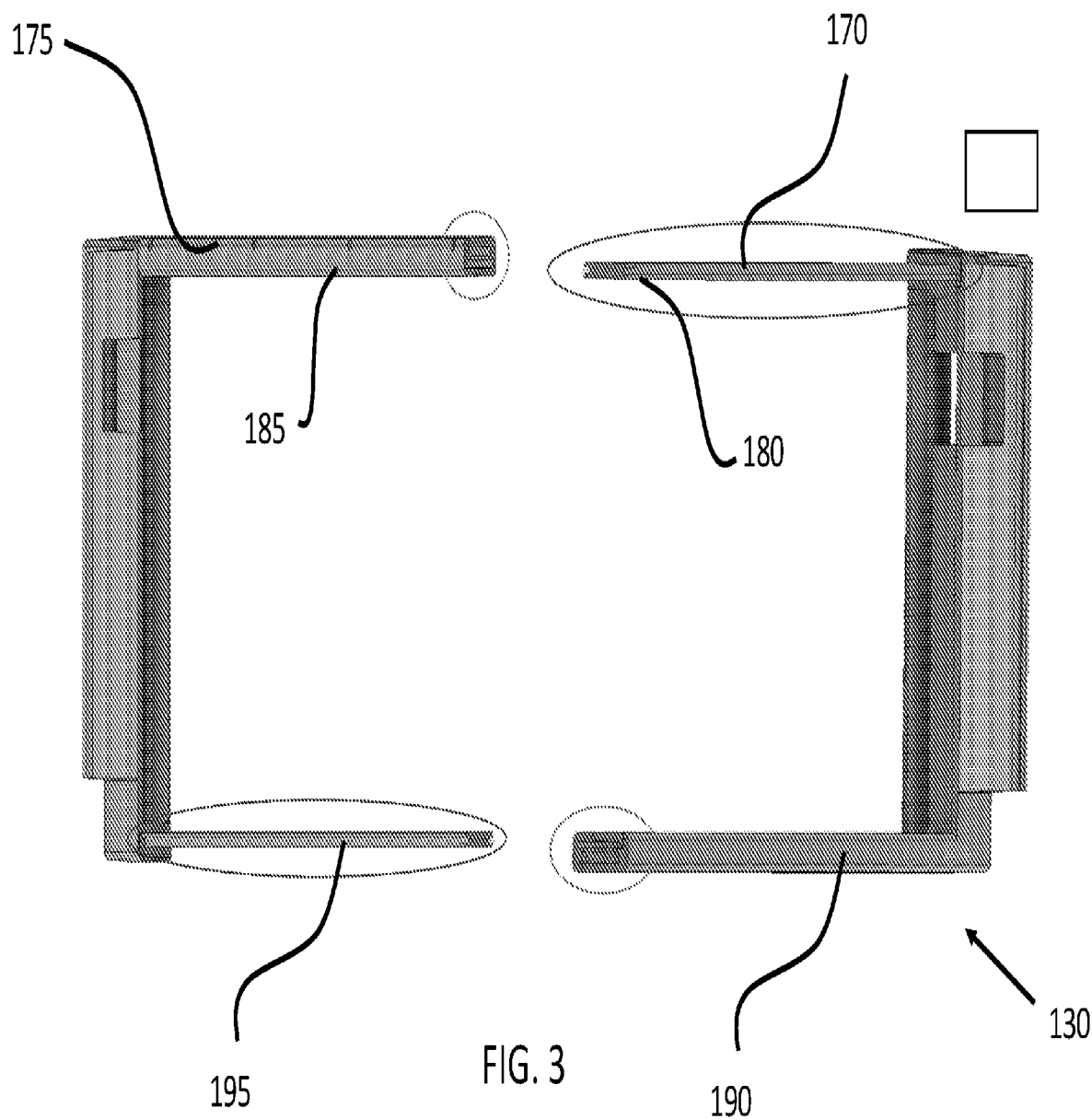
FIG. 3 is an example embodiment of the housing accessory display device of FIG. 1 in an exploded view.

Referring now to FIG. 3, the main part of housing 130 is shown as an exploded view of the two primary portions, right portion 170 and left portion 175. Right portion 170 includes an upper rail 180 and a lower rail 190. Likewise, left portion 175 includes an upper rail 185 and a lower rail 195. Upper rail 185 comprises a hollow female rail while upper rail 180 acts as a male rail complementary to rail 185 and slidable within rail 185. Lower rail 190 comprises a hollow female rail while lower rail 195 acts as a male rail complementary to rail 190 and slidable within rail 190. This design allows for housing 130 to be expandable to clamp onto virtually any size and type of display housing.

Once housing 130 is affixed to a computer or other display, a user may pull either or both of two display screens 120 and 125 from a stowed position to a use position as depicted in FIG. 1.

Figures 4, 5:
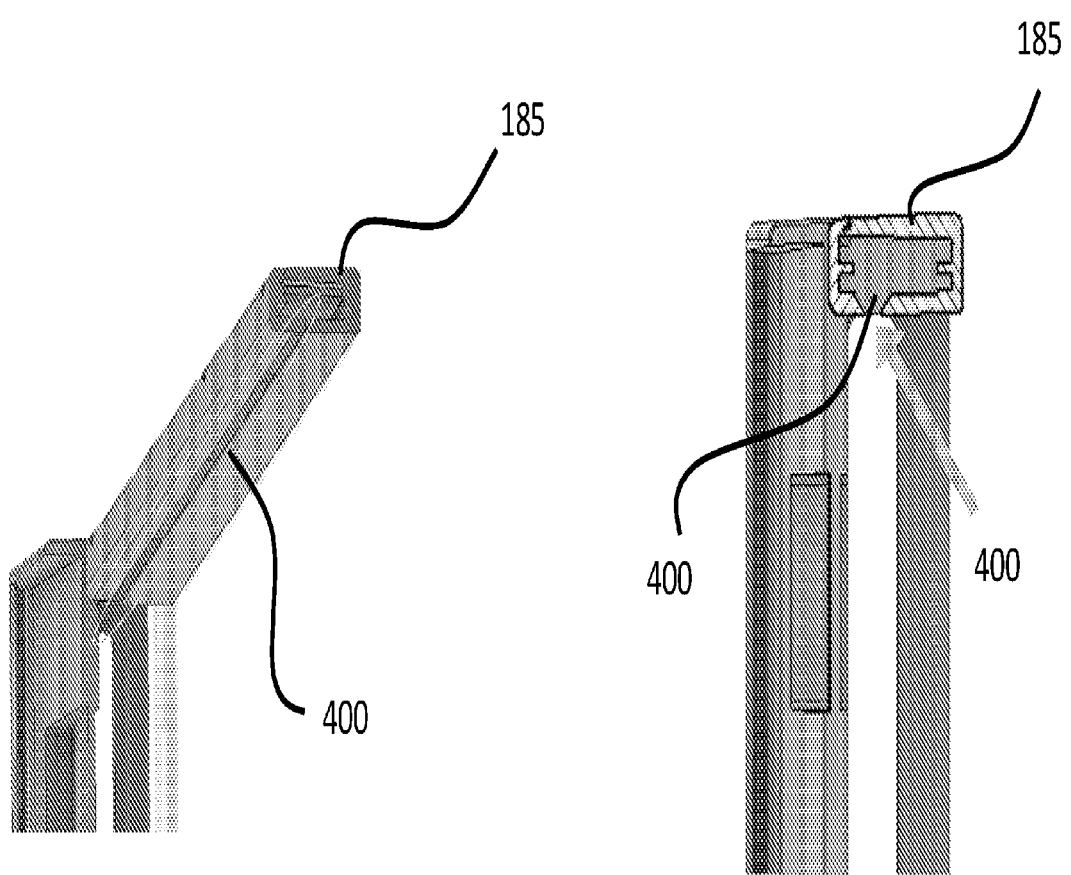
FIG. 4 is an example embodiment of a female rail of the housing.
FIG. 5 is an example cross-sectional view of the female rail of FIG. 4.
Figures 6, 7:
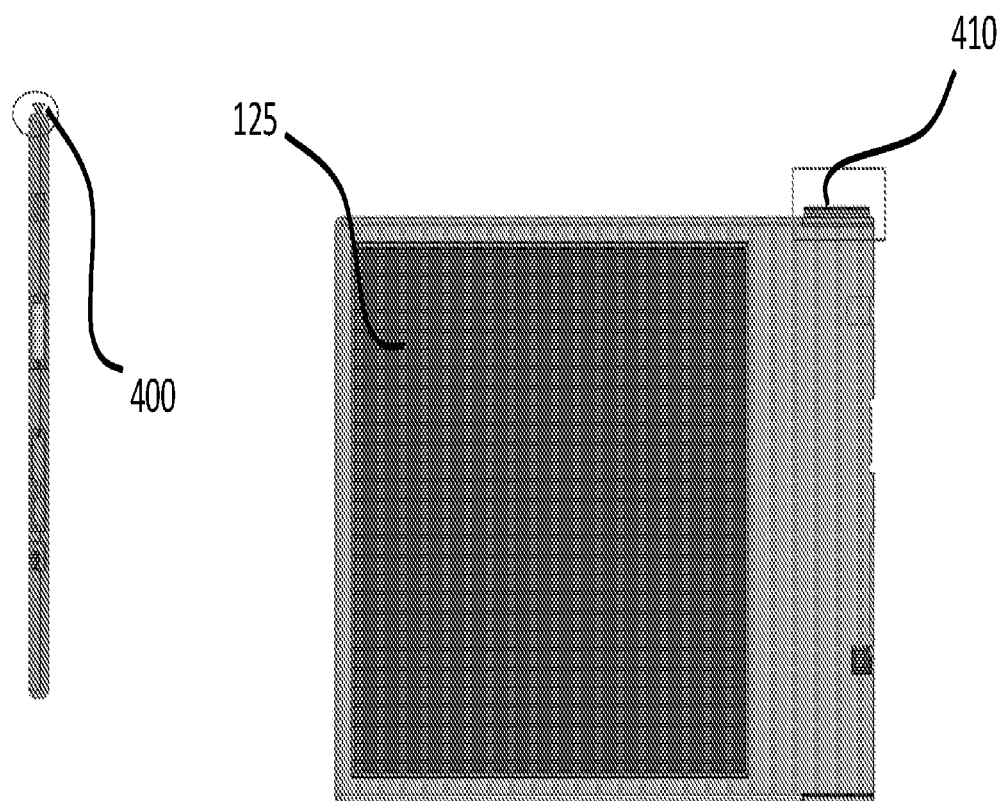
FIG. 6 is an example embodiment of a side view of a display showing a rail guide.
FIG. 7 is an example embodiment of a front view of the display of FIG. 6 showing a rail guide.

Referring now to FIG. 4, a triangular notch on the female sides of upper rail 185 and also lower rail 190 which are both the female rails, act to engage a triangular guiding slide 410 as depicted in FIG. 6 and FIG. 7 for display 125. Likewise, a triangular guiding slide is on the bottom edge of display 120. The cross-sectional view depicted in FIG. 6 shows how the triangular guiding slide 410 interfaces with the triangular notch 400.

Triangular guiding slide 400 also serves as a stopper to prevent the screen from falling out of rail 185 as display 125 is extended. Triangular guiding slide 400 also acts as a stopper on the other end of female rail 185 so that display 125 doesn't fall out the rail internally when display 125 is stowed.

Figure 8:
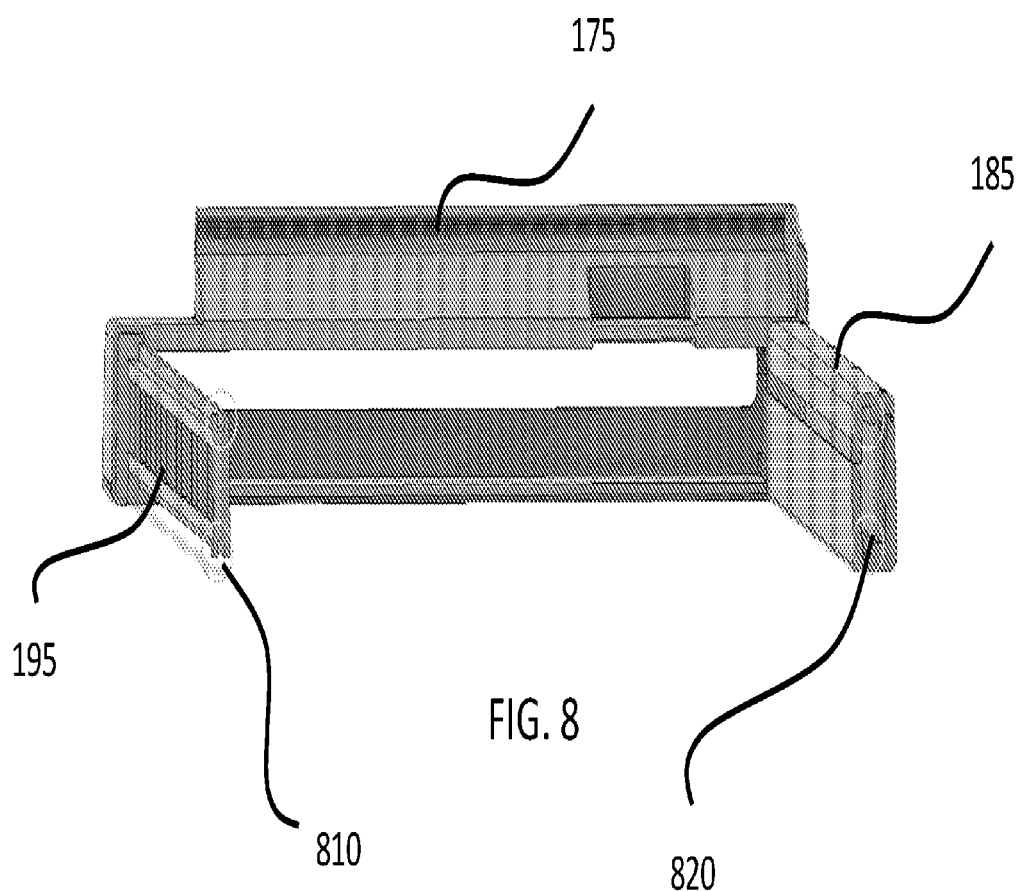
FIG. 8 is an example embodiment of a perspective end view of the left side housing portion.

Referring now to FIG. 8, an end view of the rails 185 and 195 of the left portion 175 of the housing 130 is depicted. Male rail 195 includes two guides that run along the length of rail 810. Guides 810 engage with female rail 190 which has a female cross-section similar to the female cross-section of rail 185. Rail 185 is depicted with a pair of opposing notches 820 that run along rail 185 and are configured to engage guides on male rail 180 like guides 810 of rail 195. The use of a combination of guides and complementary notches on rails 185 and 180 and similarly rails 195 and 190 allows for accurate sliding engagement of the two portions 170 and 175 of housing 130. The rail-to-rail engagement depicted is one example of an arrangement to enable expandability of housing 130 however any of a variety of other ways may be used without departing from the scope of the invention.

It should be noted that the device described may be formed of a number of different materials and formed in a variety of shapes without departing from the scope of the invention. Also, it should be noted that embodiments of the accessory device are designed to couple to the display device, such as but not limited to a laptop computer display, in a manner that is secure enough to carry the laptop computer with the accessory device attached thereto. In this way the portability of a device, such as a laptop computer is not compromised.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

The invention claimed is:

1. An accessory display device comprising:
   a housing having a first side and a second side movable relative to one another;
   a first pair of rails coupled to the first side and a second pair of rails coupled to the second side, wherein the first pair of rails is slidable relative to the second pair of rails;
   a tensioning member coupled to the first side and the second side and placing tension between the first side and the second side;
   a first engagement portion coupled to the first side and a second engagement portion coupled to the second side, wherein the first engagement portion and the second engagement portion are configured to engage a side of a display device under force created by the tensioning member; and
   a first display and a second display coupled to the housing, wherein the first display and the second display are individually movable from a stowed position to a use position.

2. The accessory display device of claim 1, wherein the first pair of rails comprises a first female rail and a first male rail and wherein the second pair of rails comprises a second female rail and a second male rail.

3. The accessory display device of claim 2,
   wherein the first male rail includes a first pair of guides and the second male rail comprises a second pair of guides;
   wherein the first female rail includes a first pair of notches and the second female rail comprises a second pair of notches; and
   wherein the first pair of guides are configured to be slidably engaged to the second pair of notches and the second pair of guides are configured to be slidably engaged to the first pair of notches.

4. The accessory display device of claim 2, wherein the first female rail slides into the second male rail and the second female rail slides into the first male rail.

5. The accessory display device of claim 1,
   wherein the first pair of rails comprises a first female rail and a first male rail;
   wherein the second pair of rails comprises a second female rail and a second male rail; and
   wherein the first male rail is slidable within the second female rail and the second male rail is slidable within the first female rail.

6. The accessory display device of claim 1,
   wherein a first rail of the first pair of rails includes a first notch and a second rail of the second pair of rails includes a second notch;
   wherein the first display comprises a first guide and the second display comprises a second guide; and
   wherein the first guide is configured to be slidably engaged with the first notch and the second guide is configured to be slidably engaged with the second notch.

7. The accessory display device of claim 1, wherein the first display and the second display being in a use position comprises the first display and the second display being extended outwards on opposite sides of the housing.

8. An accessory display device comprising:
   a housing having a first side and a second side movable relative to one another;
   a first rail coupled to the first side and a second rail coupled to the second side, wherein the first rail is slidable relative to the second rail;
   a tensioning member configured to place tension between the first side and the second side;
   a first engagement portion coupled to the first side and a second engagement portion coupled to the second side, wherein the first engagement portion and the second engagement portion are configured to engage the side of a display device under force created by the tensioning member; and
   a first display coupled to the housing, wherein the first display is movable from a stowed position to a use position.

9. The accessory display device of claim 8, wherein the first engagement portion comprises a first frame clip and the second engagement portion comprises a second frame clip.

10. The accessory display device of claim 9, wherein the first frame clip includes a lip on an upper side of the first frame clip and the second frame clip includes a lip on an upper side of the second frame clip.

11. The accessory display device of claim 8,
    wherein the first rail includes a notch and the first display includes a sliding glide,
    wherein the sliding glide interfaces with the notch, and
    wherein the first display being movable from a stowed position to a use position comprises the first display being slidable from a stowed position to a use position.

12. The accessory display device of claim 8, further comprising a second display, wherein the second display is movable from a stowed position to a use position and wherein the first display is coupled to the first side and the second display is coupled to the second side.

13. The accessory display device of claim 8, wherein the first rail comprises at least one notch and the second rail comprises at least one guide and wherein the at least one notch is slidably engaged with the at least one guide.

14. The accessory display device of claim 8, wherein the first rail is a male rail and the second rail is a female rail and wherein the first rail being slidable relative to the second rail comprises the first rail being slidable within the second rail.

15. An accessory display device comprising:
a means for housing at least one display screen, wherein the means for housing the at least one display screen has a first side and a second side slidable relative to one another;
a first means for engaging a side of a display device, wherein the first means for engaging a side of the display device is associated with the first side;
a second means for engaging a side of the display device, wherein the second means for engaging a side of the display device is associated with the second side;
a means for tensioning the first side and the second side, wherein the means for tensioning the first side and the second side places tension between the first side and the second side, whereby the means for tensioning the first side and the second side provides forces to the first means for engaging a side of the display device and the second means for engaging a side of the display device; and
a first display means within the means for housing at least one display, wherein the first display means is movable from a stowed position to a use position.

16. The accessory display device of claim 15, further comprising a means for coupling the first side and the second side, wherein the means for coupling the first side and the second side provides a mechanism for the first side and the second side to be slidable relative to one another.

17. The accessory display device of claim 16, wherein the means for coupling the first side and the second side comprises a means for slidable engagement between the first side and the second side.

18. The accessory display device of claim 17, wherein the means for slidable engagement comprises a female rail associated with the first side and a male rail associated with the second side.

19. The accessory display device of claim 18, wherein the means for slidable engagement further comprises at least one notch running along the female rail and at least one guide running along the male rail.

20. The accessory display device of claim 15, further comprising at least one guiding means for guiding at least the first display means to the use position.

* * * * *